Oct. 15, 1935.  V. EY  2,017,435

PRESSURE GAUGE

Filed Oct. 16, 1933

INVENTOR
Victor Ey
BY
Clark & Ott
ATTORNEYS

Patented Oct. 15, 1935

2,017,435

UNITED STATES PATENT OFFICE 2,017,435

PRESSURE GAUGE

Victor Ey, New York, N. Y.

Application October 16, 1933, Serial No. 693,717

11 Claims. (Cl. 73—31)

This invention has general relation to gas pressure gauges and has more particular reference to a portable gas pressure gauge for measuring either positive or negative pressure, some of the principal objects of which invention are to provide an improved gauge structure of this type which is more compact and less bulky and of relatively light weight, thereby rendering the gauge easier to handle and carry.

The invention also contemplates a gauge so constructed and arranged as to provide an instrument which functions with absolute precision and insures an accurate reading at all times and under all conditions; which is proof against leakage of the gauging liquid and against breakage if given ordinary care and if not subjected to mistreatment.

The invention further resides in a gas pressure gauge of the indicated character which embodies but few and simple parts which parts are capable of economical production and assembly.

With the above recited and other objects in view, reference is now made to the following specification and accompanying drawing in which there has been disclosed a preferred embodiment of the invention, while the claims cover variations and modifications thereof which properly fall within the scope and spirit of the invention.

Figure 1:
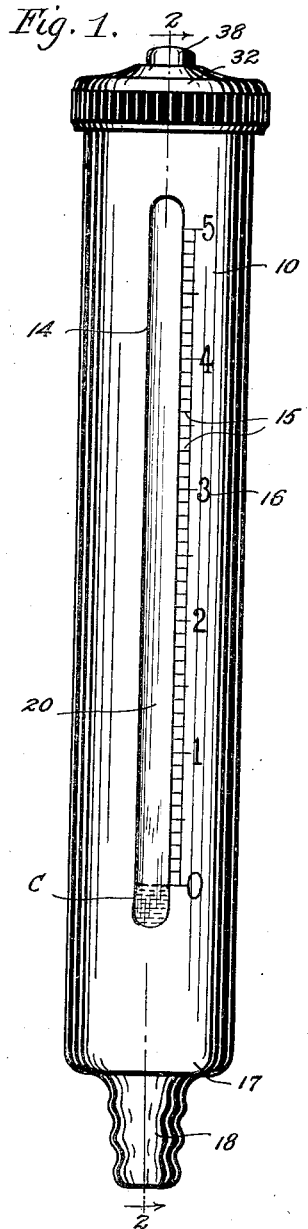
Fig. 1 is a face view of a gas pressure gauge constructed in accordance with the invention.

Referring to the drawing by characters of reference, 10 designates an outer tubular shell constituting the casing body which is preferably, as shown, of cylindrical formation and of metal or any other suitable material. The body is provided with an upper head 11, the marginal edge or periphery of which is sealed to the inner surface or periphery of the body and said head is so located within the body and spaced from the upper edge thereof so that its upper or outer surface or wall 12, together with the portion of the body which extends therebeyond, defines a pocket 13 for a purpose which is hereafter set forth.

The casing body or outer shell 10 is formed at one side thereof with a longitudinally extending sight slot 14, the opposite upper and lower ends of which are suitably spaced from the upper and lower ends of the body, appropriate pressure gauging graduations and indicia 15 and 16 being inscribed on the outer surface of the body adjacent the sight slot. It will be noted that the sight slot 14 extends below the lowermost or zero graduation in order to expose the gauging liquid so that it may be readily observed and in event it is below zero, allowance may be made therefor when reading the gauge. A lower or base head 17 closes the lower end of the casing body 10 and the lower portion 18 of the base head 17 is shaped to provide a pressure intake nozzle either for direct application to the container for the pressure to be gauged or, as shown, for receiving thereover a flexible tubing or other interposed conduit.

The device further embodies an intermediate transparent tubular member 20 which is preferably of an unbreakable material such as celluloid or the like, said member being telescopically fitted within the outer shell or casing body 10. In addition to the member 20, the gauge structure includes an inner tubular shell or tubing 21 of metal or any other suitable opaque material and said inner shell is telescopically fitted within the member 20 with its outer surface or periphery snugly engaging and in intimate contact with the inner surface or periphery of the member 20, except for a longitudinally extending inwardly offset portion 22, which portion, as shown, is of concavo-convex cross sectional configuration or which inner shell is otherwise fashioned so as to provide on its outer surface a groove extending longitudinally thereof throughout its length and which groove, when the inner shell is telescopically fitted in the member 20, defines, together with the inner surface of the transparent member, a passageway.

A sealing gasket 23 is interposed between the lower or inner surface 24 of the upper head 11 and the upper end edges of the transparent member 20 and the inner shell or tubing 21, and a similar gasket 25 is interposed between the upper surface or wall 26 of the lower or base head 17 and the lower end edges of the transparent member 20 and inner shell or tubing 21. This arrangement subdivides the interior of the gauge body into two adjacent longitudinally extending chambers or compartments A and B, the former being defined wholly with the confines of the inner shell or tubing 21 between the gaskets 23 and 25 and being of greater cross sectional area than that of the latter compartment B which is defined by the offset or grooved portion or passageway and the member 20 between the gaskets 23 and 25.

In order to establish communication between said chambers or compartments A and B, whereby they, in effect, constitute the two legs of a U-tube gauge, the lower end of the offset portion 22 is notched as at 27, it being understood that a suitable gauging liquid C is arranged in the compartments.

In order to admit the gas pressure to the compartment or chamber A which constitutes the pressure leg of the U-tube, the lower or base head has extending axially therethrough a pressure intake aperture 28. A standpipe 29 communicates with and extends upwardly from said aperture with upper end spaced an appropriate distance above the maximum upper level of the gauging liquid C to prevent escape and leakage of the liquid therefrom. It is also notable that the substantially central location of the upper end of the standpipe and the capacity of the compartment or leg A in proportion to the amount of gauging liquid employed is such as to prevent escape and leakage of the liquid irrespective of the position in which the device is held.

In order to provide means for venting the chamber B, constituting the gauging leg of the U-tube, so that a reading may be obtained, the upper gasket 23 and the upper head 11 are provided with registering eccentric vent openings 30 and 31 located so as to be disposed in alignment and in communication with the gauging chamber or leg B.

A cap 32 is threadedly engaged over the upper end of the outer tubular shell or casing body 10 and said cap is formed with a central venting opening 33 and has located therein a sealing gasket 34 provided with a central opening 35 registering with the cap venting opening 33. A compressible elastically expansible element 36 of pure Pará rubber of its equivalent, is arranged in the pocket 13 and when normally expanded, fills the pocket. The element 36 is provided with a vent passage 37 which is disposed in alignment with the vent openings 30 and 31 and is so located as to be out of alignment with the openings 33 and 35 of the cap 32 and gasket 34. A plunger 38 is provided which loosely extends through the vent opening 33 and gasket opening 35 and said plunger is formed with an enlarged head 39 at its lower end of greater size than the openings 33 and 35, which head is seated against the central portion of the upper surface of the compressible element 36.

Figure 2:
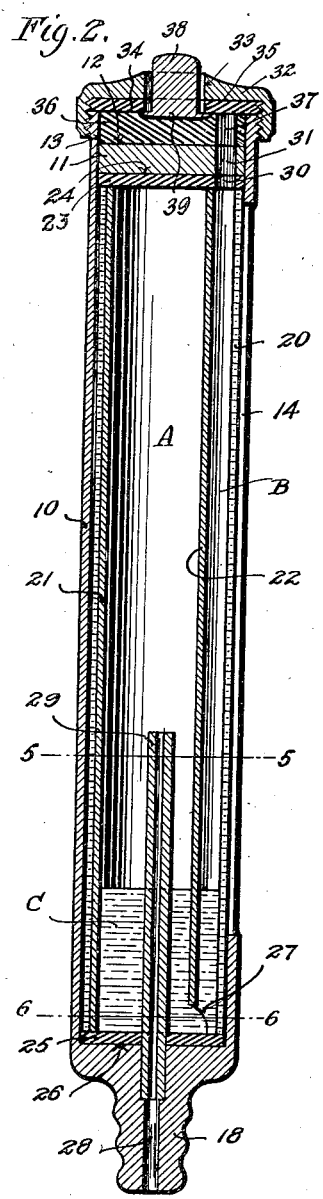
Fig. 2 is a vertical longitudinal section therethrough taken approximately on a plane indicated by the line 2—2 of Fig. 1.
Figure 3:
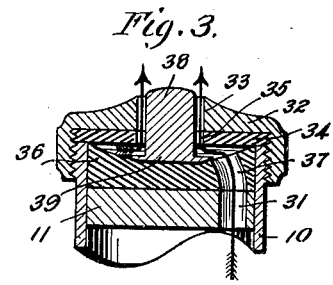
Fig. 3 is an enlarged fragmentary vertical sectional view through the upper end of the gauge, illustrating the position of the parts when the gauge is manually held in venting condition.
Figure 4:
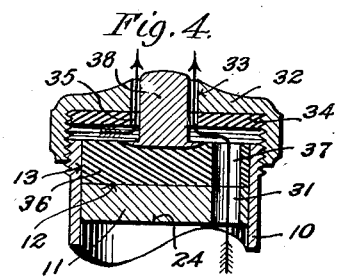
Fig. 4 is a similar view illustrating the venting means set in open position.
Figure 5:
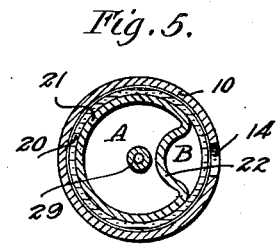
Fig. 5 is a horizontal transverse sectional view taken approximately on a plane indicated by the line 5—5 of Fig. 2.
Figure 6:
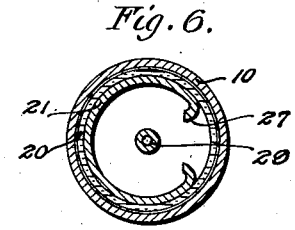
Fig. 6 is a similar view taken approximately on a plane indicated by the line 6—6 of Fig. 2.

The venting means may be utilized to optionally require the holding of the plunger 38 depressed to vent the gauging chamber B as illustrated in Fig. 3 or may be set so as to constantly vent the chamber C as illustrated in Fig. 4 of the drawing. When the cap 32 is screwed down tightly as in Figs. 1, 2, and 3, the inherently elastic expansible character of the element 36 normally effects a closing of the vent means and requires the user to exert a pressure on the plunger 38, to accomplish the venting of the gauging chamber. Immediately upon release of the pressure on the button 38, the elastic element moves the plunger and returns to a normal position which closes the vent means. This renders the gauge fool proof and avoids leakage of the gauging liquid from the gauge. The vent means may be set in an open condition, as illustrated in Fig. 4, by merely unscrewing the cap partially so that the cap gasket 34 is spaced above the element 36.

If it becomes necessary to refill the gauge with gauging liquid or to add thereto, this may be readily accomplished by removing the cap and introducing the fluid through the vent openings 30, 31, and 37.

Figure 7:
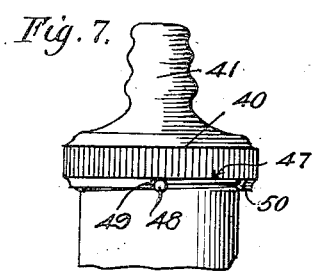
Fig. 7 is a fragmentary side view illustrating a substitute or interchangeable cap member in applied position, adapting the gauge for use in measuring negative pressure.
Figure 8:
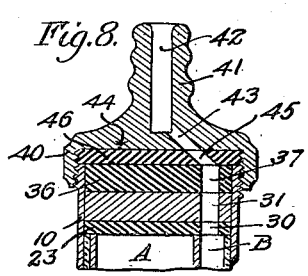
Fig. 8 is a fragmentary sectional view thereof.

The gauge may also be utilized as a vacuum gauge or for measuring pressures below atmospheric pressure and this is accomplished by substituting for the cap 32, a cap 40, such as illustrated in Figs. 7 and 8 of the drawing. The cap 32 is removed and the interchangeable or substitute cap 40 is threadedly engaged over the upper end of the outer tubular body or casing 10 and said cap 40 is fashioned to provide an upstanding nozzle portion 41 for direct application to the container of the pressure to be gauged or for receiving thereover a hose or other interposed conduit. The nozzle portion 41 is formed with a bore 42, which bore extends inwardly from the outer end of the nozzle, while a duct 43 leads from the inner end of the bore 42 and opens through the inner surface 44 of the cap, where it communicates with a port or passage 45 in a yieldable elastic gasket 46 secured within the cap and in flat contact with the surface 44 thereof. The lower outlet end of the port 45 is eccentrically disposed so that in one position of the cap it registers with the vent passage 37 of the elastically expansible element 36.

In order to provide means by virtue of which the user of the gauge may determine when the port 45 is in registry with the vent passage 37, the cap 40 is provided with a notch 47 in its lower edge, the opposite ends of which cooperate with a pin 48 which serves as a stop to restrict the turning of the cap 40 in opposite directions, it being understood that the arrangement is such that when the shoulder 49, formed by one end of the notch, engages with the pin 48, it will indicate that the passage or port 45 is in registry, and when the shoulder 50, defined by the opposite end of the notch, is brought into engagement with the pin 48, it will indicate that the port or passage 45 is out of registry with the vent opening 37. The inherent expansible elastic nature of the element 36 and the gasket 46 will maintain a sealed condition of the confronting abutting faces of said element and gasket irrespective of the slight axial movement of the cap with respect to the gauge body 10 resulting from the pitch of the threads. In use of the gauge for measuring vacuum or negative pressure, it is obvious that the bore 42 of the cap 40 is connected with the container, while the chamber or compartment A is open to the atmosphere through the stand pipe 29 and intake aperture 28. It thus follows that the difference between the atmospheric pressure exerted on the level of the fluid column in the compartment A and the negative pressure which is admitted to the compartment or chamber B above the level of the fluid column in said chamber or compartment B, will cause the level in said compartment to rise so that the reading may be readily made. If it is desired to maintain the reading on the gauge, the user may turn the cap to dispose the port or passage 45 out of registry with the vent opening 37.

What is claimed is:

1. A pressure gauge including an inner tubular shell having a longitudinally extending grooved portion formed with a notch at the lower end thereof, and an outer transparent tubular shell intimately contacting with the portion of the outer surface of the inner shell beyond the grooved portion, and heads closing the opposite ends of said shells to define a pair of chambers communicating at their lower ends through the notch, means for admitting to one chamber the pressure to be gauged, and means for venting the other chamber.

2. A pressure gauge including an inner tubular shell having a longitudinally extending grooved portion formed with a notch at the lower end thereof, and an outer transparent tubular shell intimately contacting with the portion of the outer surface of the inner shell beyond the grooved portion, and heads closing the opposite ends of said shells to define a pair of chambers communicating at their lower ends through the notch, means for admitting to one chamber the pressure to be gauged, means for venting the other chamber, and an outer shell connecting the heads and having a sight slot extending longitudinally thereof and aligned with the groove portion of the inner shell.

3. A pressure gauge including an inner tubular shell having a longitudinally extending grooved portion formed with a notch at the lower end thereof, and an outer transparent tubular shell intimately contacting with the portion of the outer surface of the inner shell beyond the grooved portion, and heads closing the opposite ends of said shells to define a pair of chambers communicating at their lower ends through the notch and containing a gauging liquid, normally closed manually openable venting means for one of the chambers and means for admitting the pressure to be gauged to the other chamber.

4. A pressure gauge including an inner tubular shell having a longitudinally extending grooved portion formed with a notch at the lower end thereof, and an outer transparent tubular shell intimately contacting with the portion of the outer surface of the inner shell beyond the grooved portion, and heads closing the opposite ends of said shells to define a pair of chambers communicating at their lower ends through the notch and containing a gauging liquid, means for admitting the pressure to be gauged to one of the chambers, and normally closed manually openable vent means for the other chamber, said vent means including a vented cap adjustable to a position for setting the vent means to an opened condition.

5. A pressure gauge including an inner tubular shell having a longitudinally extending grooved portion provided with a notch at its lower end, an outer transparent tubular shell fitting thereover and intimately contacting with the portion of the outer shell lying beyond the grooved portion of the inner shell, heads closing the opposite ends of the shells to define a pressure chamber and a gauging chamber, the former being of greater cross sectional area than the latter, and said chambers having communication at their lower ends through the notch, a gauging liquid in said chambers, the lower head having a pressure intake leading into the pressure chamber above the normal level of the liquid and the upper head having a vent leading from the upper end of the gauging chamber.

6. A pressure gauge including an inner tubular shell having a longitudinally extending grooved portion provided with a notch at its lower end, an outer transparent tubular shell fitting thereover and intimately contacting with the portion of the outer shell lying beyond the grooved portion of the inner shell, heads closing the opposite ends of the shells to define a pressure chamber and a gauging chamber, the former being of greater cross sectional area than the latter and said chambers communicating at their lower ends through the notch, a gauging liquid in said chambers, the lower head having a pressure intake leading into the pressure chamber above the normal level of the liquid and the upper head having a vent from the upper end of the gauging chamber, and an outer casing connecting said heads and having a sight slot extending longitudinally thereon and located in alignment with the grooved portion of the inner shell.

7. A pressure gauge including an inner tubular shell having a longitudinally extending grooved portion provided with a notch at its lower end, an outer transparent tubular shell fitting thereover and intimately contacting with the portion of the outer shell lying beyond the grooved portion of the inner shell, heads closing the opposite ends of the shells to define a pressure chamber and a gauging chamber, the former being of greater cross sectional area than the latter and said chambers communicating at their lower ends through the notch, a gauging liquid in said chambers, the lower head having a pressure intake leading into the pressure chamber above the normal level of the liquid and the upper head having a vent from the upper end of the gauging chamber, and an outer casing connecting said heads and having a sight slot extending longitudinally thereon and located in alignment with the grooved portion of the inner shell, said outer casing extending beyond the upper head and defining therewith a pocket, a compressible elastically expansible element filling said pocket when expanded, said element having a vent opening registering with the upper head vent and a cap fitted over the upper end of the casing, threadedly engaged therewith and having a central opening defining a vent and a plunger loosely extending through said cap vent opening and having an inner enlarged head of greater size than the cap vent and seated against the compressible element.

8. A pressure gauge including a transparent tubular shell, heads closing the upper and lower ends thereof, means within said shell subdividing the same into pressure and gauging chambers communicating adjacent their lower ends and containing a gauging liquid, means for admitting pressure to the pressure chamber above the level of the liquid, the upper head having an eccentrically arranged vent opening communicating with the gauging chamber, said upper head being spaced from the upper end of the shell to define a pocket, a cap closing the pocket and having a concentric aperture and venting means comprising an expansible elastic element filling said pocket and having an eccentric vent passage in registry with the vent opening of the head and means extending through the cap aperture for compressing the elastic element.

9. A pressure gauge including a transparent tubular shell, heads closing the upper and lower ends thereof, a partition element having engaging portions of the same contour as the tubular shell contacting the latter for a substantial portion of its circumference and extending from the upper head downwardly throughout the major length of the shell so as to define within the shell a pair of chambers having communication adjacent the lower ends, a gauging liquid within said chambers, means for admitting fluid pressure to one chamber and means for venting the other chamber.

10. A pressure gauge including an inner tubular shell having a longitudinally extending grooved portion provided with a notch at its lower end, an outer transparent tubular shell fitting thereover and intimately contacting with the portion of the outer shell lying beyond the grooved portion of the inner shell, heads closing the opposite ends of the shells to define a pressure chamber and a gauging chamber, the former being of greater cross sectional area than the latter and said chambers having communication at their lower ends through the notch, a gauging liquid in said chambers, the lower head having a pressure intake leading into the pressure chamber above the normal level of the liquid and the upper head having an opening leading from the upper end of the gauging chamber and a cap structure for controlling the open end of the gauging chamber to establish communication with a negative pressure container when atmospheric pressure is admitted to the pressure chamber for the purpose of gauging said negative pressure.

11. A pressure gauge including an inner tubular shell having a longitudinally extending grooved portion provided with a notch at its lower end, an outer transparent tubular shell fitting thereover and intimately contacting with the portion of the outer shell lying beyond the grooved portion of the inner shell, heads closing the opposite ends of the shells to define a pressure chamber and a gauging chamber, the former being of greater cross sectional area than the latter and said chambers having communication at their lower ends through the notch, a gauging liquid in said chambers, the lower head having a pressure intake leading into the pressure chamber above the normal level of the liquid and the upper head having an opening leading from the upper end of the gauging chamber and a cap structure for controlling the open end of the gauging chamber to establish communication with a negative pressure container when atmospheric pressure is admitted to the pressure chamber for the purpose of gauging said negative pressure, said cap structure having a passage extending therethrough and mounted for movement to dispose said passage respectively in and out of communication with the gauging chamber.

VICTOR EY.